(12) United States Patent
Harmon, Jr.

(10) Patent No.: US 6,938,652 B1
(45) Date of Patent: Sep. 6, 2005

(54) AUTOMATIC FISH FEEDING APPARATUS

(76) Inventor: Roosevelt Harmon, Jr., 3316 Heather Dr., Markham, IL (US) 60426

( * ) Notice: Subject to any disclaimer, the term of this patent is extended or adjusted under 35 U.S.C. 154(b) by 0 days.

(21) Appl. No.: 10/859,932

(22) Filed: Jun. 4, 2004

(51) Int. Cl.$^7$ ................................................ B65B 1/04
(52) U.S. Cl. ........................ 141/98; 141/256; 222/460; 222/344; 222/181.1; 119/51.04
(58) Field of Search .......................... 141/98, 256, 255; 222/181.1, 181.2, 344, 460; 119/51.04, 51.11

(56) References Cited

U.S. PATENT DOCUMENTS

| | | |
|---|---|---|
| 3,171,385 A | 3/1965 | Docker et al. |
| 3,578,209 A | 5/1971 | Fresar |
| 3,688,744 A | 9/1972 | Kaplan |
| 4,055,146 A | 10/1977 | Smrt |
| 4,296,710 A | 10/1981 | Sillers, III |
| 4,782,790 A | 11/1988 | Batson |
| 5,037,018 A | 8/1991 | Matsuda et al. |
| 5,483,923 A | 1/1996 | Sabbara |
| D383,251 S | 9/1997 | Zimmerman |
| 6,082,299 A * | 7/2000 | Halford .................... 119/51.04 |

* cited by examiner

Primary Examiner—Steven O. Douglas

(57) ABSTRACT

An automatic fish feeding apparatus includes a housing that has a bottom wall and a peripheral wall. The bottom wall has a feed opening extending therethrough. A funnel is mounted in the housing. The funnel has pour opening therein that is unaligned with the feed opening. A conveyor belt assembly is mounted within the housing and positioned beneath the pour opening. The conveyor belt assembly includes a conveyor belt extending over the feed opening. A motor is mechanically coupled to the conveyor belt assembly for selectively rotating the conveyor belt in first direction such that an upper portion of the conveyor belt moves toward the front wall. Fish food may be positioned in the funnel such that the fish food is positioned onto the upper portion of the conveyor belt. The fish food falls through the feed opening when the conveyor belt is rotated. A control actuates the motor.

11 Claims, 5 Drawing Sheets

AUTOMATIC FISH FEEDING APPARATUS

BACKGROUND OF THE INVENTION

1. Field of the Invention

The present invention relates to fish feeding devices and more particularly pertains to a new fish feeding device for providing fish food at pre-selected intervals.

2. Description of the Prior Art

The use of fish feeding devices and the like is known in the prior art. U.S. Pat. No. 4,782,790 describes an similar device that is adapted for automatically feeding a dog at measured intervals. A fish feeding device is shown in U.S. Pat. No. 4,296,710 that includes a hopper for holding a quantity of fish food. The hopper is fluidly coupled to an automatic dispensing assembly for selectively dispensing fish food from the hopper. Yet another such device that utilizes a hopper and an attached dispensing assembly is U.S. Pat. No. 3,578,209.

While these devices fulfill their respective, particular objectives and requirements, the need remains for a device that includes a conveyor belt which moves food from a funnel and through an opening so that it may fall into a fish tank. Also needed is a fill sensor therein for signaling to a user of the device when refilling of the funnel is required. Additionally, the device should include a plurality of brackets for selectively attaching the device to a fish tank as needed by the user of the device.

SUMMARY OF THE INVENTION

The present invention meets the needs presented above by generally comprising a housing that has a bottom wall and a peripheral wall is attached to and extends upwardly from the bottom wall. The bottom wall has a feed opening extending therethrough. An upper edge of the peripheral wall defines a fill opening into the housing. A funnel is mounted in the housing and divides an upper portion of the housing from a lower portion of the housing. The funnel has pour opening therein. The pour opening is unaligned with the feed opening. A conveyor belt assembly is mounted within the housing and positioned beneath and adjacent to the pour opening. The conveyor belt assembly includes a conveyor belt extending over the feed opening. A motor is mechanically coupled to the conveyor belt assembly for selectively rotating the conveyor belt in first direction such that an upper portion of the conveyor belt moves toward the front wall. Fish food may be positioned in the funnel such that the fish food is positioned onto the upper portion of the conveyor belt. The fish food falls through the feed opening when the conveyor belt is rotated. A control is operationally coupled to the motor. The control includes a first actuator for selectively determining a number of times the motor is turned on per 24 hours. The control includes a second actuator for selectively determining an amount of time the motor is turned on each time the motor is turned on. A plurality of brackets is attached to the peripheral wall for selectively mounting the housing on a fish tank.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
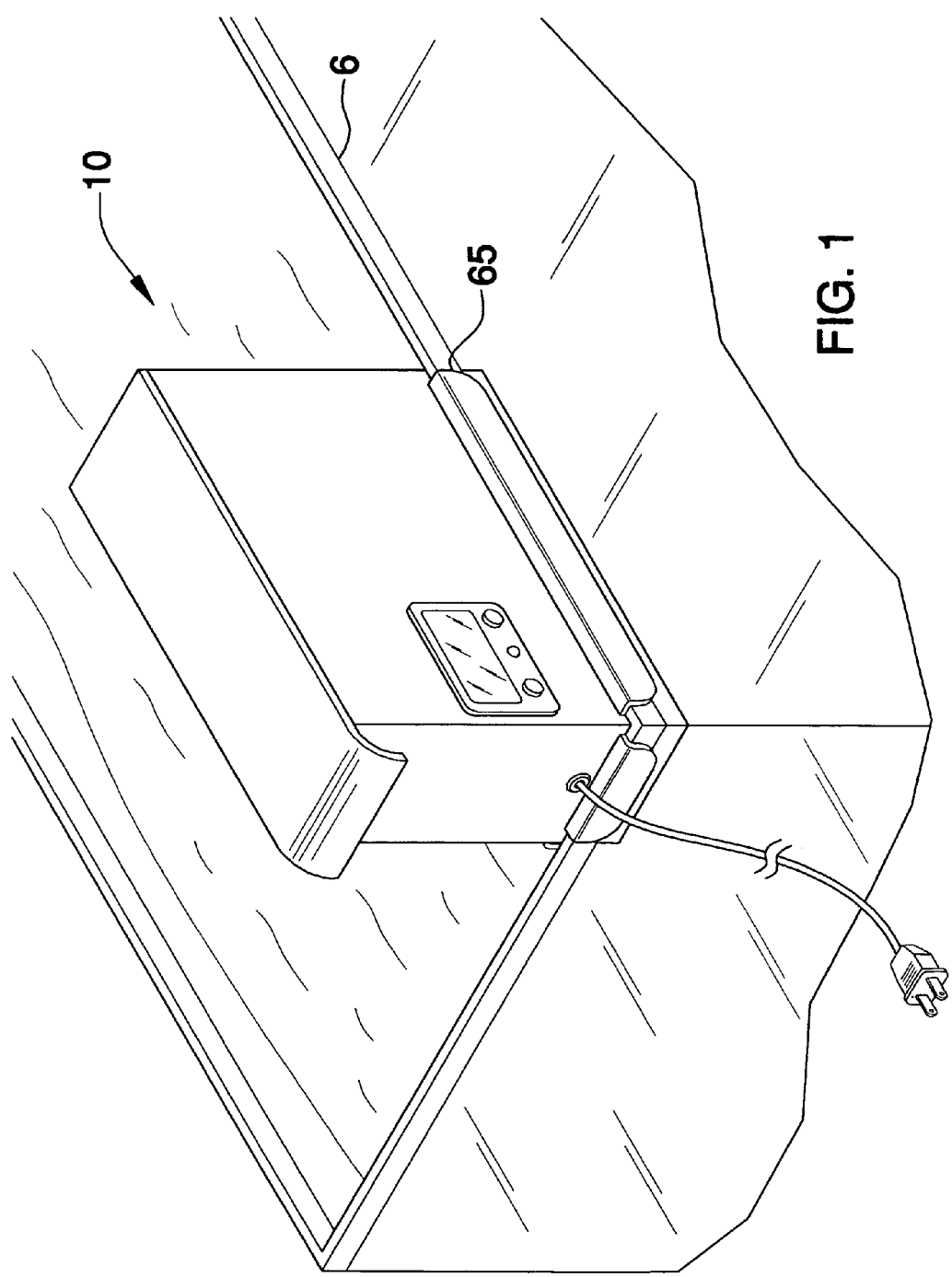
FIG. 1 is a perspective view of an automatic fish feeding apparatus according to the present invention.
Figure 2:
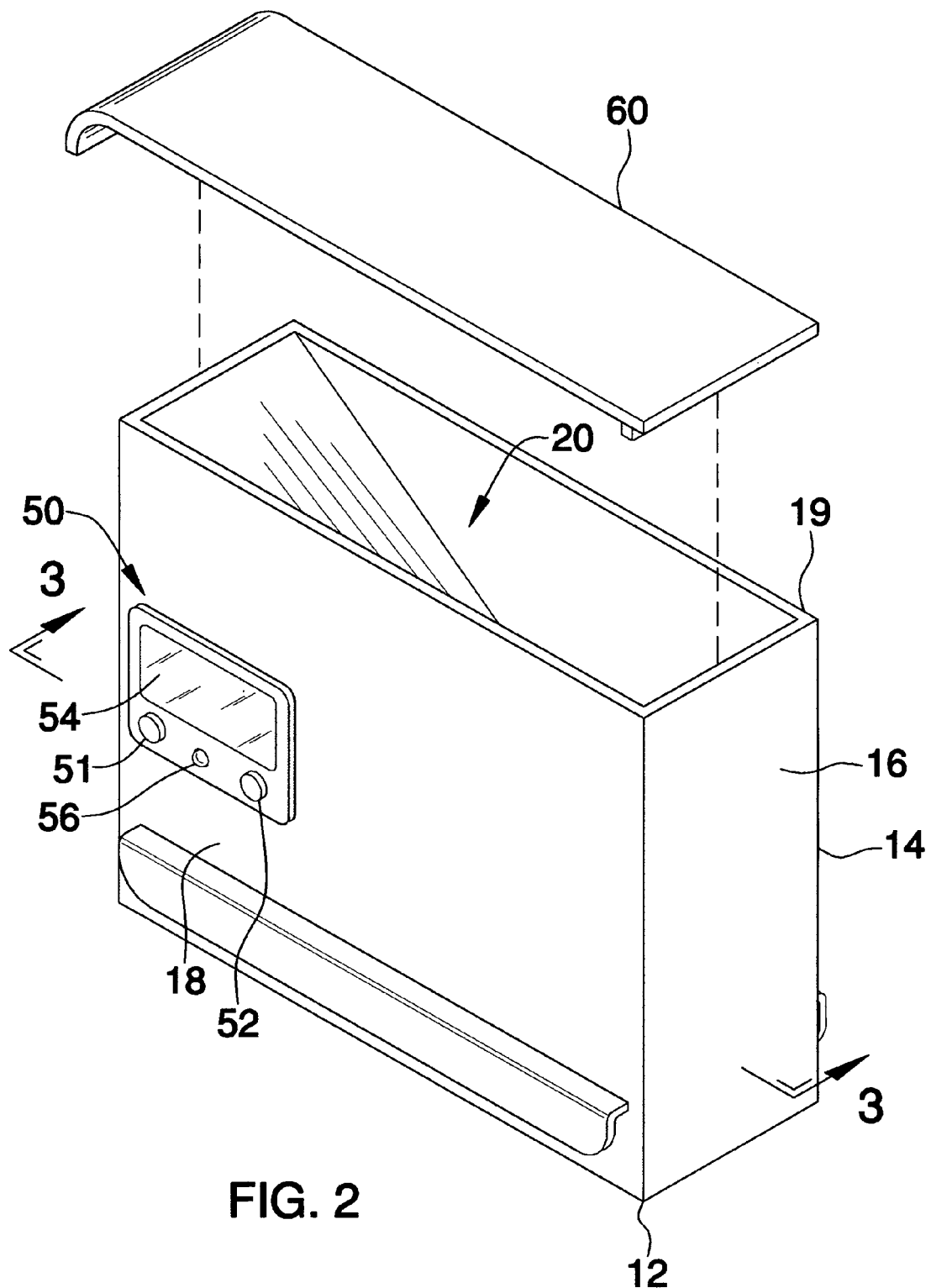
FIG. 2 is a perspective view of the present invention.
Figure 3:
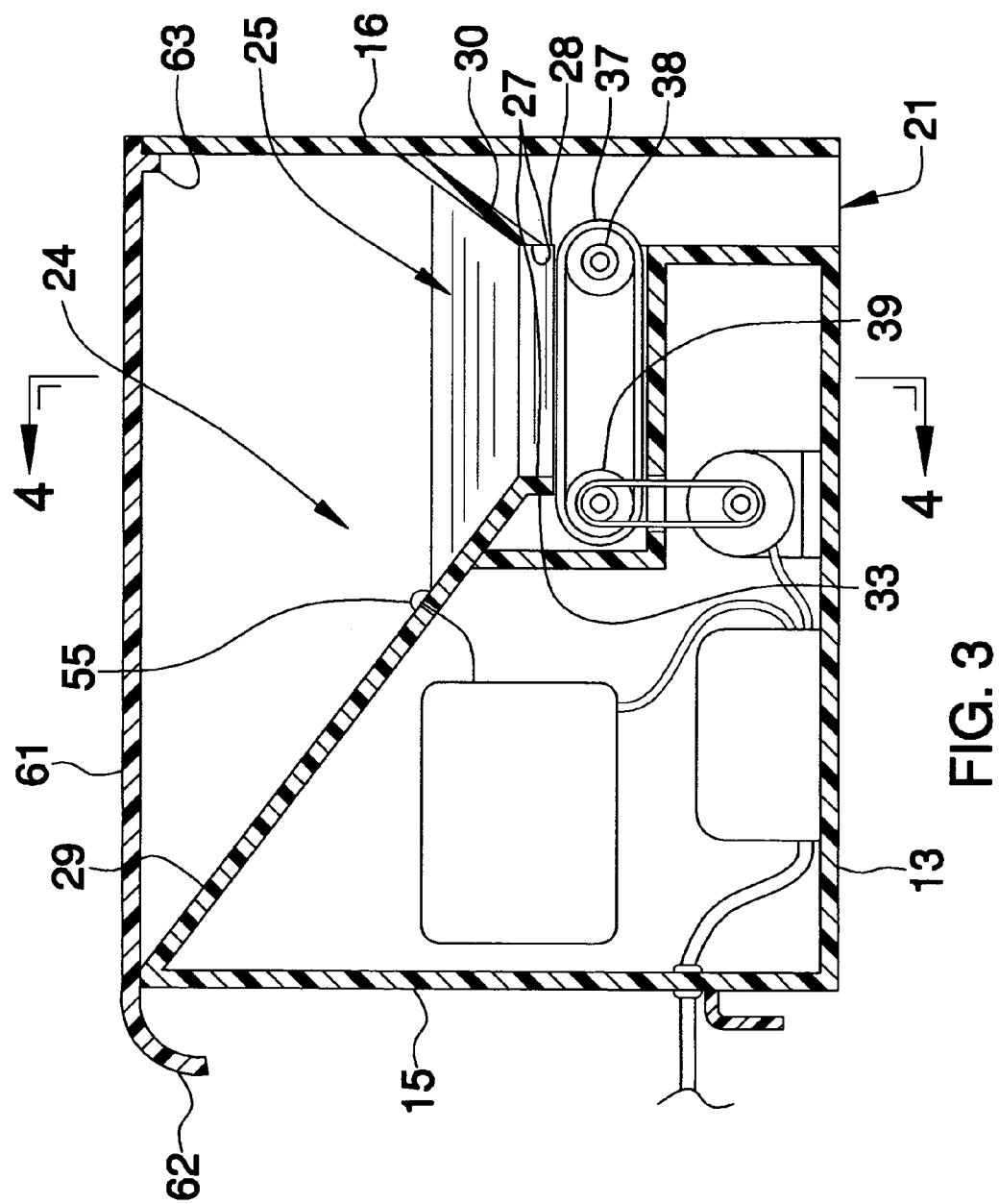
FIG. 3 is a cross-sectional view taken along line 3—3 of FIG. 2 of the present invention.
Figure 4:
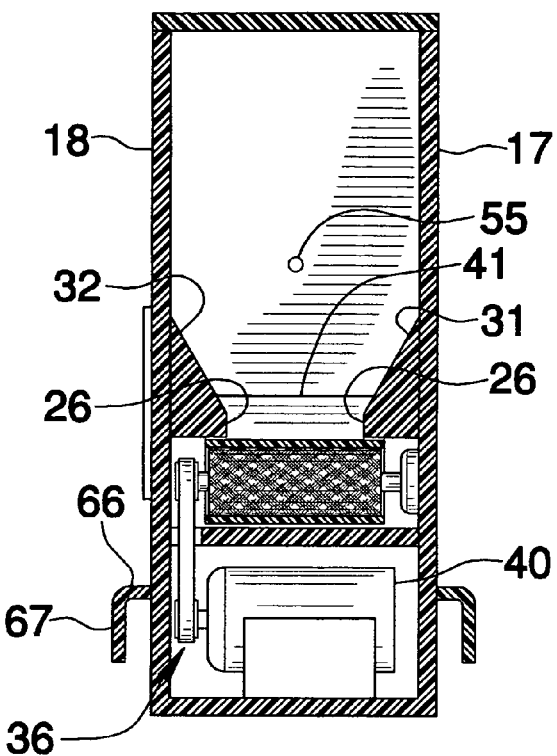
FIG. 4 is a cross-sectional view taken along line 4—4 of FIG. 3 of the present invention.
Figure 5:
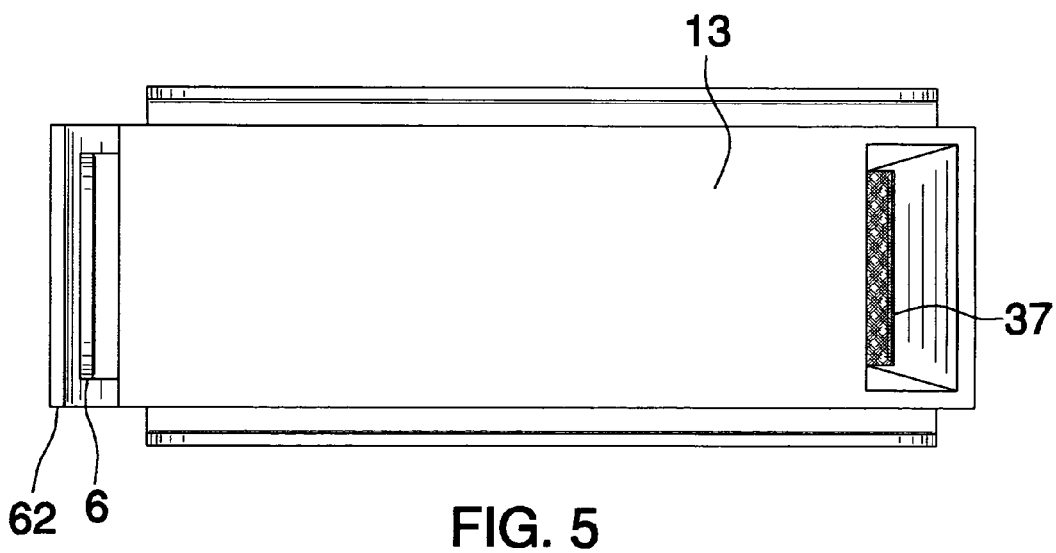
FIG. 5 is a bottom view of the present invention.
Figure 6:
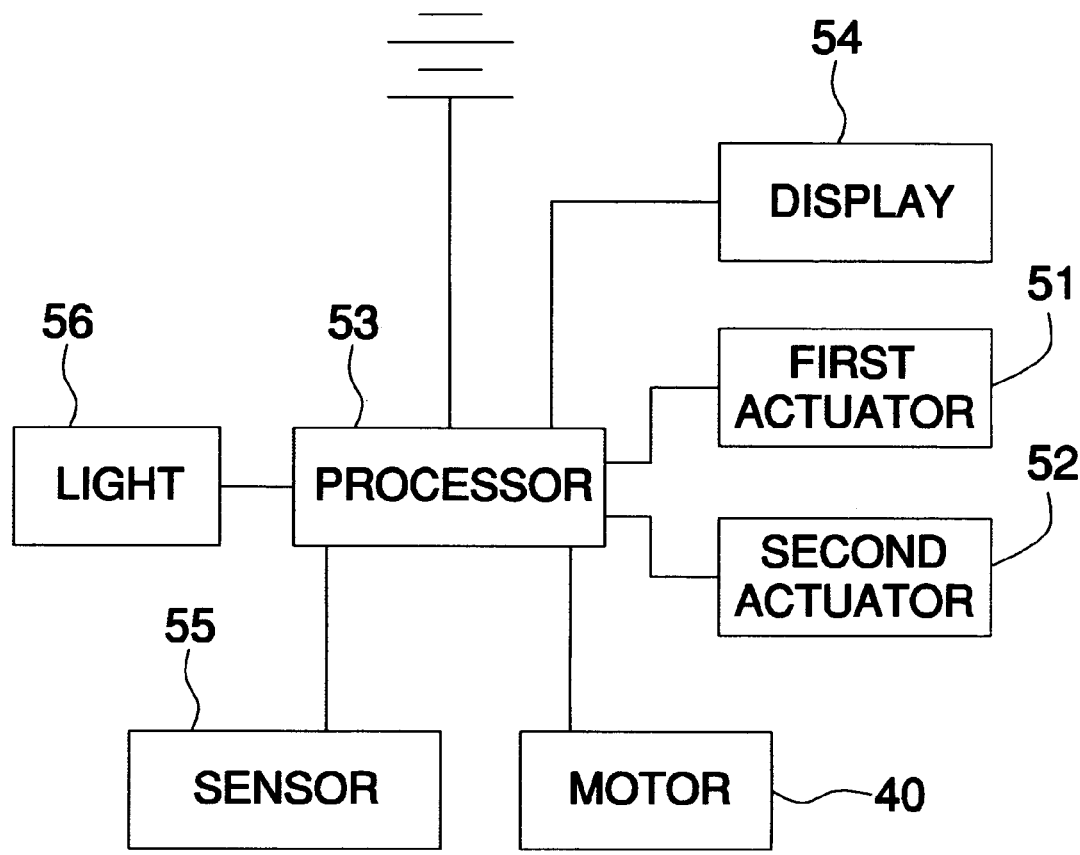
FIG. 6 is an electronic schematic view of the present invention.

With reference now to the drawings, and in particular to FIGS. 1 through 6 thereof, a new fish feeding device embodying the principles and concepts of the present invention and generally designated by the reference numeral 10 will be described.

As best illustrated in FIGS. 1 through 6, the automatic fish feeding apparatus 10 generally comprises a housing 12 that has a bottom wall 13 and a peripheral wall 14 that is attached to and extends upwardly from the bottom wall 13. The peripheral wall 14 includes a back wall 15, a front wall 16, a first lateral wall 17 and a second lateral wall 18. An upper edge 19 of the peripheral wall 14 defines a fill opening 20 into the housing 12. The bottom wall 13 has a feed opening 21 extending therethrough. The feed opening 21 is positioned adjacent to the front wall 16. The housing 12 has a height generally between 4 inches and 8 inches, a length generally between 4 inches and 8 inches and a width generally between 1.5 inches and 3 inches.

A funnel 24 is mounted in the housing 12 and divides an upper portion of the housing 12 from a lower portion of the housing 12. The funnel 24 has pour opening 25 therein. The pour opening 25 is unaligned with the feed opening 21. The pour opening 25 has a substantially rectangular shape that has a first pair of bottom edges 26 and a second pair of bottom edges 27. The first pair of bottom edges 26 is orientated parallel to a plane of the first lateral wall 17. Each of a pair of flanges 28 is attached to and extends downwardly from one of the bottom edges of the first pair of bottom edges 26 for reasons to be more fully explained below. The flanges 28 each have a height less than ¼ inch.

The funnel 24 is preferably constructed of four inner walls. A first inner wall 29 is attached to the back wall 15 adjacent to the upper edge 19 and generally extends toward a juncture of the front 16 and bottom 13 walls. A second inner wall 30 is attached to the front wall 16, generally between the upper edge 19 and the bottom wall 13, and extends in at an angle similar to the first inner wall 29 toward the bottom wall 13. The first 29 and second 30 walls each have free edges, which define the second pair of edges 26, that are horizontally aligned with each other so that the first inner wall 29 is substantially longer than the second inner wall 30. Third 31 and fourth 32 inner walls are each attached to one of the first 17 and second 18 lateral walls and are angled inward to form the funnel 24. Free edges of the third 31 and fourth 32 inner walls define the first pair of bottom edges 25. A rear flange 33 may be attached to the first inner wall 29.

A conveyor belt assembly 36 is mounted within the housing 12 and is positioned beneath and adjacent to the pour opening 25. The conveyor belt assembly 36 includes a conveyor belt 37 that extends over the feed opening 21. The conveyor belt assembly 36 includes a pair of rollers 38, 39. Each of the rollers 38, 39 is rotatably mounted to and extends away from the first lateral wall 17. The rollers 38, 39 are horizontally aligned with each other and are positioned beneath and on either side of the pour opening 25. A proximate one 38 of the rollers with respect to the front wall 16 extends over the feed opening 21. The conveyor belt 37 is mounted on and extends around the rollers 38, 39. A distance between the conveyer belt 37 the flanges 28, 33 is less than ⅛ inch.

A motor 40 is mechanically coupled to the conveyor belt assembly 36 for selectively rotating the conveyor belt 37 in first direction such that an upper portion 41 of the conveyor belt 37 moves toward the front wall 16. The motor 40 is an electric motor coupled to at least one of the rollers 38, 39 by way of a belt, chain or drive shaft. Fish food may be positioned in the funnel 24 such that the fish food is positioned onto the upper portion 41 of the conveyor belt 37. The fish food falls through the feed opening 21 when the conveyor belt 37 is rotated.

The distance between the flanges 28, 33 and conveyor belt 37 prevents the fish food from falling laterally away from the conveyor belt 37. Also, this forms a relatively small area between the second pair of bottom edges 27 and the conveyor belt 37 to ensure that only a small quantity of fish food may be positioned on the conveyor belt 37 at any one time. The angle of the first inner wall 29 forces the fish food toward the second inner wall 30 which is over the feed opening 21 to cause the fish food to tend to fall toward the feed opening 21.

A control 50 is operationally coupled to the motor 40. The control 50 includes a first actuator 51 for selectively determining a number of times the motor 40 is turned on per 24 hours and the control 50 includes a second actuator 52 for selectively determining an amount of time the motor 40 is turned on each time the motor 40 is turned on. The first 51 and second 52 actuators are electrically coupled to a processor 53 and the processor 53 may be electrically coupled to a display screen 54 for displaying the selections of the user of the apparatus 10. The control 50 is preferably mounted on an outer surface of the peripheral wall 14.

A refill sensor 55 is mounted within the funnel 24. An indicator light 56 is electrically coupled to the refill sensor 55. The sensor 55 is adapted for turning on the indicator light 56 when the funnel 24 is less than about one third half full. The refill sensor 55 preferably comprises a pressure sensor mounted on the first inner wall 29.

A cover 60 is removably positioned over the fill opening 20. The cover 60 is comprised of a panel 61 that has a size and shape substantially equal the size and shape of the full opening 20. The cover 60 has a back edge which has a handle 62 thereon for facilitating removal of the cover 60. The panel 61 has a bottom surface having a ridge 63 thereon which abuts an inner surface of the front wall 16 when the cover 60 is positioned on the housing 12. The ridge 63 prevents the cover 60 from falling off of the housing 12.

Each of a plurality of brackets 65 is attached to the peripheral wall 14 for selectively mounting the housing 12 on a fish tank 6. Each of the brackets 65 includes an elongated horizontal portion 66 and an elongated vertical portion 67 that is attached to and extends downwardly from the horizontal portion 66. Each of the horizontal portions 66 is attached to the peripheral wall such that each of the horizontal portions 66 is horizontally aligned. A first of the brackets 65 is attached to the back wall 15, a second of the brackets 65 is attached to the first lateral wall 17 and a third of the brackets 65 is attached to the second lateral wall 18. The horizontal portions 66 are generally positioned between ½ inch and 2 inches from the bottom wall 13 and the vertical portions 67 generally extend about 1 inch downwardly from a respective one of the horizontal portions 66.

In use, the housing 12 is mounted on a fish tank 6 as shown in FIG. 1 so that the feed opening 21 is positioned over the water of the fish tank 6. The housing 12 has brackets 65 on both of the first 17 and second 18 lateral walls to allow the user to determine which corner of the fish tank 6 the housing 12 will be positioned in. Fish food is placed into the funnel 24. The user sets the control 50 to select when, and for how long, the motor 40 will rotate the conveyor belt 37. The longer the time of rotation, the more food which will be deposited in the fish tank 6. Depending on the size of the housing 12, conveyor belt size 37, rotation speed of the conveyor belt 37 and funnel size 24, recommendations may be formulated for an amount of food to be delivered per the amount of time the motor 40 is on. However, the user may also experiment with various times as the size of the particles of fish food, as well as flakes or pellets, may affect the amount of food dispensed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A fish feeding apparatus comprising:
   a housing having a bottom wall and a peripheral wall being attached to and extending upwardly from said bottom wall, said bottom wall having a feed opening extending therethrough, an upper edge of said peripheral wall defining a fill opening into said housing;
   a funnel being mounted in said housing and dividing an upper portion of said housing from a lower portion of said housing, said funnel having pour opening therein, said pour opening being unaligned with said feed opening;
   a conveyor belt assembly being mounted within said housing and positioned beneath and adjacent to said pour opening, said conveyor belt assembly including a conveyor belt extending over said feed opening;
   a motor being mechanically coupled to said conveyor belt assembly for selectively rotating said conveyor belt in first direction such that an upper portion of said conveyor belt moves toward said front wall, wherein fish food may be positioned in said funnel such that the fish food is positioned onto the upper portion of said conveyor belt, wherein the fish food falls through the feed opening when said conveyor belt is rotated;

a control being operationally coupled to said motor, said control including a first actuator for selectively determining a number of times said motor is turned on per 24 hours, said control including a second actuator for selectively determining an amount of time said motor is turned on each time said motor is turned on; and a plurality of brackets being attached to said peripheral wall for selectively mounting said housing on a fish tank.

2. The apparatus according to claim 1, wherein said peripheral wall includes a back wall, a front wall, a first lateral wall and a second lateral wall, said feed opening being positioned adjacent to said front wall.

3. The apparatus according to claim 1, said pour opening having a substantially rectangular shape having a first pair of bottom edges and a second pair of bottom edges, said first pair of bottom edges being orientated parallel to a plane of said first lateral wall, a pair of flanges, each of said flanges being attached to and extending downwardly from one of the bottom edges of said first pair of bottom edges, each of said flanges having a height less than ¼ inch, a distance between said conveyer belt and said conveyer belt and said flanges being less than ⅛ inch.

4. The apparatus according to claim 3, wherein said conveyor belt assembly includes a pair of rollers, each of said rollers being rotatably mounted to and extending away from said first lateral wall, said rollers being horizontally aligned with each other, said rollers being positioned beneath and on either side of said pour opening, a proximate one of said rollers with respect to said front wall extending over said feed opening, said conveyor belt being mounted on and extending around said rollers.

5. The apparatus according to claim 1, a refill sensor being mounted within said funnel, an indicator light being electrically coupled to said refill sensor, said sensor being adapted for turning on said indicator light when said funnel is less than about one third half full.

6. The apparatus according to claim 1, a cover being removably positioned over said fill opening.

7. The apparatus according to claim 1, wherein each of said brackets including an elongated horizontal portion and an elongated vertical portion attached to and extending downwardly from said horizontal portion, each of said horizontal portions being attached to said peripheral wall such that each of said horizontal portions are horizontally aligned, a first of said brackets being attached to said back wall, a second of said brackets being attached to said first lateral wall and a third of said brackets being attached to said second lateral wall.

8. The apparatus according to claim 3, wherein each of said brackets including an elongated horizontal portion and an elongated vertical portion attached to and extending downwardly from said horizontal portion, each of said horizontal portions being attached to said peripheral wall such that each of said horizontal portions are horizontally aligned, a first of said brackets being attached to said back wall, a second of said brackets being attached to said first lateral wall and a third of said brackets being attached to said second lateral wall.

9. The apparatus according to claim 8, a refill sensor being mounted within said funnel, an indicator light being electrically coupled to said refill sensor, said sensor being adapted for turning on said indicator light when said funnel is less than about one third half full.

10. The apparatus according to claim 3, a refill sensor being mounted within said funnel, an indicator light being electrically coupled to said refill sensor, said sensor being adapted for turning on said indicator light when said funnel is less than about one third half full.

11. A fish feeding apparatus comprising:

a housing having a bottom wall and a peripheral wall being attached to and extending upwardly from said bottom wall, said peripheral wall including a back wall, a front wall, a first lateral wall and a second lateral wall, an upper edge of said peripheral wall defining a fill opening into said housing, said bottom wall having a feed opening extending therethrough, said feed opening being positioned adjacent to said front wall;

a funnel being mounted in said housing and dividing an upper portion of said housing from a lower portion of said housing, said funnel having pour opening therein, said pour opening being unaligned with said feed opening, said pour opening having a substantially rectangular shape having a first pair of bottom edges and a second pair of bottom edges, said first pair of bottom edges being orientated parallel to a plane of said first lateral wall;

a pair of flanges, each of said flanges being attached to and extending downwardly from one of the bottom edges of said first pair of bottom edges, each of said flanges having a height less than ¼ inch;

a conveyor belt assembly being mounted within said housing and positioned beneath and adjacent to said pour opening, said conveyor belt assembly including a conveyor belt extending over said feed opening, said conveyor belt assembly including;

a pair of rollers, each of said rollers being rotatably mounted to and extending away from said first lateral wall, said rollers being horizontally aligned with each other, said rollers being positioned beneath and on either side of said pour opening, a proximate one of said rollers with respect to said front wall extending over said feed opening;

said conveyor belt being mounted on and extending around said rollers, a distance between said conveyer belt and said conveyer belt and said flanges being less than ⅛ inch;

a motor being mechanically coupled to said conveyor belt assembly for selectively rotating said conveyor belt in first direction such that an upper portion of said conveyor belt moves toward said front wall, wherein fish food may be positioned in said funnel such that the fish food is positioned onto the upper portion of said conveyor belt, wherein the fish food falls through the feed opening when said conveyor belt is rotated;

a control being operationally coupled to said motor, said control including a first actuator for selectively determining a number of times said motor is turned on per 24 hours, said control including a second actuator for selectively determining an amount of time said motor is turned on each time said motor is turned on;

a refill sensor being mounted within said funnel, an indicator light being electrically coupled to said refill sensor, said sensor being adapted for turning on said indicator light when said funnel is less than about one third half full;

a cover being removably positioned over said fill opening; and a plurality of brackets being attached to said peripheral wall for selectively mounting said housing on a fish tank, each of said brackets including an elongated horizontal portion and an elongated vertical portion attached to and extending downwardly from said horizontal portion, each of said horizontal portions being attached to said peripheral wall such that each of said horizontal portions are horizontally aligned, a first of said brackets being attached to said back wall, a second of said brackets being attached to said first lateral wall and a third of said brackets being attached to said second lateral wall.

* * * * *